(12) United States Patent
Haugen

(10) Patent No.: US 7,590,745 B2
(45) Date of Patent: Sep. 15, 2009

(54) SYSTEM AND METHOD FOR ANALYZING A ROUTER IN A SHARED NETWORK SYSTEM

(75) Inventor: James B. Haugen, Denver, CO (US)

(73) Assignee: International Business Machines Corporation, Armonk, NY (US)

(*) Notice: Subject to any disclaimer, the term of this patent is extended or adjusted under 35 U.S.C. 154(b) by 740 days.

(21) Appl. No.: 09/798,835

(22) Filed: Mar. 2, 2001

(65) Prior Publication Data

US 2002/0138647 A1 Sep. 26, 2002

(51) Int. Cl.
*G06F 15/16* (2006.01)
(52) U.S. Cl. ............... 709/229; 709/224; 709/249; 726/3
(58) Field of Classification Search ......... 709/220, 709/224, 229, 223, 242, 249; 370/254, 401; 713/155, 201, 187, 189; 714/37; 715/736; 726/8, 22, 23, 26, 3; 379/189; 340/825.01
See application file for complete search history.

(56) References Cited

U.S. PATENT DOCUMENTS

| | | | | | |
|---|---|---|---|---|---|
| 5,049,873 | A | * | 9/1991 | Robins et al. | 340/825.01 |
| 5,369,707 | A | * | 11/1994 | Follendore, III | 713/155 |
| 5,684,957 | A | * | 11/1997 | Kondo et al. | 713/201 |
| 5,805,801 | A | * | 9/1998 | Holloway et al. | 713/201 |
| 5,838,461 | A | * | 11/1998 | Hsieh | 358/442 |
| 5,867,647 | A | * | 2/1999 | Haigh et al. | 726/23 |
| 5,892,903 | A | * | 4/1999 | Klaus | 726/25 |
| 5,926,105 | A | * | 7/1999 | Wakamatsu | 370/401 |
| 5,931,946 | A | * | 8/1999 | Terada et al. | 713/201 |
| 5,935,249 | A | * | 8/1999 | Stern et al. | 726/21 |
| 5,946,679 | A | * | 8/1999 | Ahuja et al. | 707/3 |
| 6,101,539 | A | * | 8/2000 | Kennelly et al. | 709/223 |
| 6,108,702 | A | * | 8/2000 | Wood | 709/224 |
| 6,134,591 | A | * | 10/2000 | Nickles | 709/229 |
| 6,182,136 | B1 | * | 1/2001 | Ramanathan et al. | 709/224 |
| 6,195,658 | B1 | * | 2/2001 | Comito et al. | 707/6 |
| 6,205,122 | B1 | * | 3/2001 | Sharon et al. | 370/254 |
| 6,298,445 | B1 | * | 10/2001 | Shostack et al. | 726/25 |
| 6,301,668 | B1 | * | 10/2001 | Gleichauf et al. | 726/25 |
| 6,321,338 | B1 | * | 11/2001 | Porras et al. | 726/25 |
| 6,324,656 | B1 | * | 11/2001 | Gleichauf et al. | 714/37 |
| 6,377,987 | B1 | * | 4/2002 | Kracht | 709/220 |
| 6,393,486 | B1 | * | 5/2002 | Pelavin et al. | 709/238 |
| 6,408,336 | B1 | * | 6/2002 | Schneider et al. | 709/229 |
| 6,415,321 | B1 | * | 7/2002 | Gleichauf et al. | 709/224 |

(Continued)

FOREIGN PATENT DOCUMENTS

JP 07-183932 7/1995

(Continued)

OTHER PUBLICATIONS

Jones, G., "Router Audit Tool and Benchmark," Feb. 20, 2002, posted on http://ncat.sourceforge.net/RouterAuditTool.ppt, pp. 1-20.

(Continued)

*Primary Examiner*—Douglas B Blair
(74) *Attorney, Agent, or Firm*—Arthur J. Samodovitz; Hoffman & Warnick LLC

(57) ABSTRACT

A system and method for analyzing a router in a shared network system (SNS). Specifically, the present invention retrieves information for each network participating in the SNS from a common router. By identifying source and destination networks for communications in the SNS, and then comparing the identified networks to network policies, a network map, and/or flow tables, security findings for each network can be identified. These findings, as well as the network map, can then be outputted to each network according to their preferences in a report or summary format.

6 Claims, 4 Drawing Sheets

| | | | |
|---|---|---|---|
| 6,477,651 B1 * | 11/2002 | Teal | 726/23 |
| 6,535,227 B1 * | 3/2003 | Fox et al. | 715/736 |
| 6,574,737 B1 * | 6/2003 | Kingsford et al. | 713/201 |
| 6,647,400 B1 * | 11/2003 | Moran | 707/205 |
| 6,760,420 B2 * | 7/2004 | Heilmann et al. | 379/189 |
| 6,826,692 B1 * | 11/2004 | White | 726/8 |
| 6,883,034 B1 * | 4/2005 | Pelavin et al. | 709/242 |
| 6,886,102 B1 * | 4/2005 | Lyle | 726/23 |
| 6,968,377 B1 * | 11/2005 | Gleichauf et al. | 709/224 |
| 6,975,851 B2 * | 12/2005 | Boesjes | 455/406 |
| 6,996,845 B1 * | 2/2006 | Hurst et al. | 726/25 |
| 7,024,686 B2 * | 4/2006 | Brawn et al. | 726/1 |
| 7,047,286 B2 * | 5/2006 | Hill et al. | 709/220 |
| 7,188,191 B1 * | 3/2007 | Hovell et al. | 709/245 |
| 7,246,370 B2 * | 7/2007 | Valente et al. | 726/1 |
| 7,263,719 B2 * | 8/2007 | Jemes et al. | 726/12 |
| 2001/0034847 A1 * | 10/2001 | Gaul, Jr. | 713/201 |
| 2001/0042213 A1 * | 11/2001 | Jemes et al. | 713/201 |
| 2002/0059404 A1 * | 5/2002 | Schaaf et al. | 709/220 |
| 2002/0066030 A1 * | 5/2002 | Brawn et al. | 713/201 |
| 2002/0093527 A1 * | 7/2002 | Sherlock et al. | 345/736 |
| 2004/0205356 A1 * | 10/2004 | Maida-Smith et al. | 713/200 |

FOREIGN PATENT DOCUMENTS

| | | |
|---|---|---|
| JP | 07-334445 | 12/1995 |
| JP | 08-065384 | 3/1996 |
| JP | 09-172455 | 6/1997 |
| JP | 10-210033 | 8/1998 |
| JP | 11-340980 | 12/1999 |
| JP | 11-353254 | 12/1999 |

OTHER PUBLICATIONS

U.S. Appl. No. 60/212,126, Geoffrey H. Cooper, entitled "Security Policy Manager System".

* cited by examiner

SYSTEM AND METHOD FOR ANALYZING A ROUTER IN A SHARED NETWORK SYSTEM

BACKGROUND OF THE INVENTION

1. Technical Field

The present invention generally relates to a system and method for analyzing a router in a shared network system (SNS). More particularly, the present invention relates to a system and method for identifying security findings by comparing information retrieved from the router to source and destination networks identified by entities participating in the SNS.

2. Background Art

As the use of shared network systems (SNS) becomes more prevalent, the concerns over security increases. In particular, in an SNS, many networks are connected to each other through a common router. Typically, the networks belong to different business entities. By using an SNS, the different entities can share hardware and software resources and communicate with each other (when desired). However, given the nature of an SNS, the risk of divulging confidential information is great. Accordingly, the need to maintain proper security between the networks is essential.

This security concern is compounded when the entity networks include sub-networks. Specifically, in many cases, an entity also requires security between their sub-networks. For example, an entity network may include the sub-networks "payroll" and "engineering department." The entity may not want users of the "engineering department" sub-network to receive communications from or access the "payroll" sub-network. However, because of the multitude of network connections that exist (e.g., between entity networks, sub-networks, and network users) current systems often fail to provide efficient and accurate security management for the entire SNS. In contrast, current systems either focus solely on individual entity networks or require access to each entity network and sub-network to manage the security of the SNS.

Therefore, there exists the need for a system and method for analyzing the common router of the SNS to identify such security risks (i.e., findings). Moreover, a need exists for such a system and method to obtain any information necessary for identifying the findings from the common router without having to access or communicate with individual entity networks and sub-networks. A need also exists for the system and method to output the findings and other information according to the preferences of the entities.

SUMMARY OF THE INVENTION

The present invention overcomes the problems of existing security systems by providing a system and method for analyzing a router in an SNS. Specifically, the present invention provides security for a SNS by analyzing the common router without having to access or communicate with individual entity networks and sub-networks. Under the present invention, the entities whose networks utilize the SNS will submit information to the common router. The information preferably includes internal network maps, filter files, flow tables, security policies, and preferences. By parsing the provided filter files and the flow tables, the present invention will, among other things, identify source and destination networks for communication flows, and identify findings. The findings are identified by comparing the identified source and destination networks to the flow tables, an overall network map, and/or the policies. These findings and the network map can then be outputted to the entities according to their preferences in the form of reports or executive summaries.

According to a first aspect of the present invention, a system for analyzing a router in a shared network system is provided. The system comprises: (1) an information retrieval system for retrieving information from the router; (2) a map system for generating a network map based on the retrieved information; (3) a network system for identifying source networks and destination networks based on the retrieved information; and (4) a findings system for identifying findings by comparing the retrieved information to the identified source and destination networks.

According to a second aspect of the present invention, a method for analyzing a router in a shared network system is provided. The method comprises the steps of: (1) retrieving information from the router; (2) generating a network map based on the information; (3) identifying source networks and destination networks based on the information; and (4) identifying findings by comparing the information to the identified source and destination networks.

According to a third aspect of the present invention, a system for analyzing a router in a shared network system is provided. The system comprises: (1) an information retrieval system for retrieving filter files, flow tables, internal maps, policies, and preferences from the router; (2) a map generation system for generating a network map based on the internal maps; (3) a network identification system for identifying source networks and destination networks by parsing the filter files and flow tables; and (4) a findings system for identifying findings by comparing the identified source and destination networks to the network map and policies.

According to a fourth aspect of the present invention, a program product stored on a recordable media for analyzing a router in a shared network system is provided. When executed, the program product comprises: (1) an information retrieval system for retrieving information from the router; (2) a map system for generating a network map based on the retrieved information; (3) a network system for identifying source networks and destination networks based on the retrieved information; and (4) a findings system for identifying findings by comparing the retrieved information to the identified source and destination networks.

According to a fifth aspect of the present invention, a computer system for analyzing a router in a shared network system is provided. The computer system comprises: (1) a processor; (2) a computer system memory; (3) an interface; and (4) a software product stored on the computer system memory and executable by the processor, wherein the software product comprises: (a) an information retrieval system for retrieving information from the router; (b) a map system for generating a network map based on the retrieved information; (c) a network system for identifying source networks and destination networks based on the retrieved information; and (d) a findings system for identifying findings by comparing the retrieved information to the identified source and destination networks.

Therefore, the present invention provides a system and method for analyzing a router. Specifically, the system and method of the present invention analyze the common router of an SNS to identify findings relating to communications between networks and sub-networks of entities participating in the SNS.

BRIEF DESCRIPTION OF THE DRAWINGS

These and other features and advantages of this invention will be more readily understood from the following detailed description of the various aspects of the invention taken in conjunction with the accompanying drawings in which.

Figure 1:
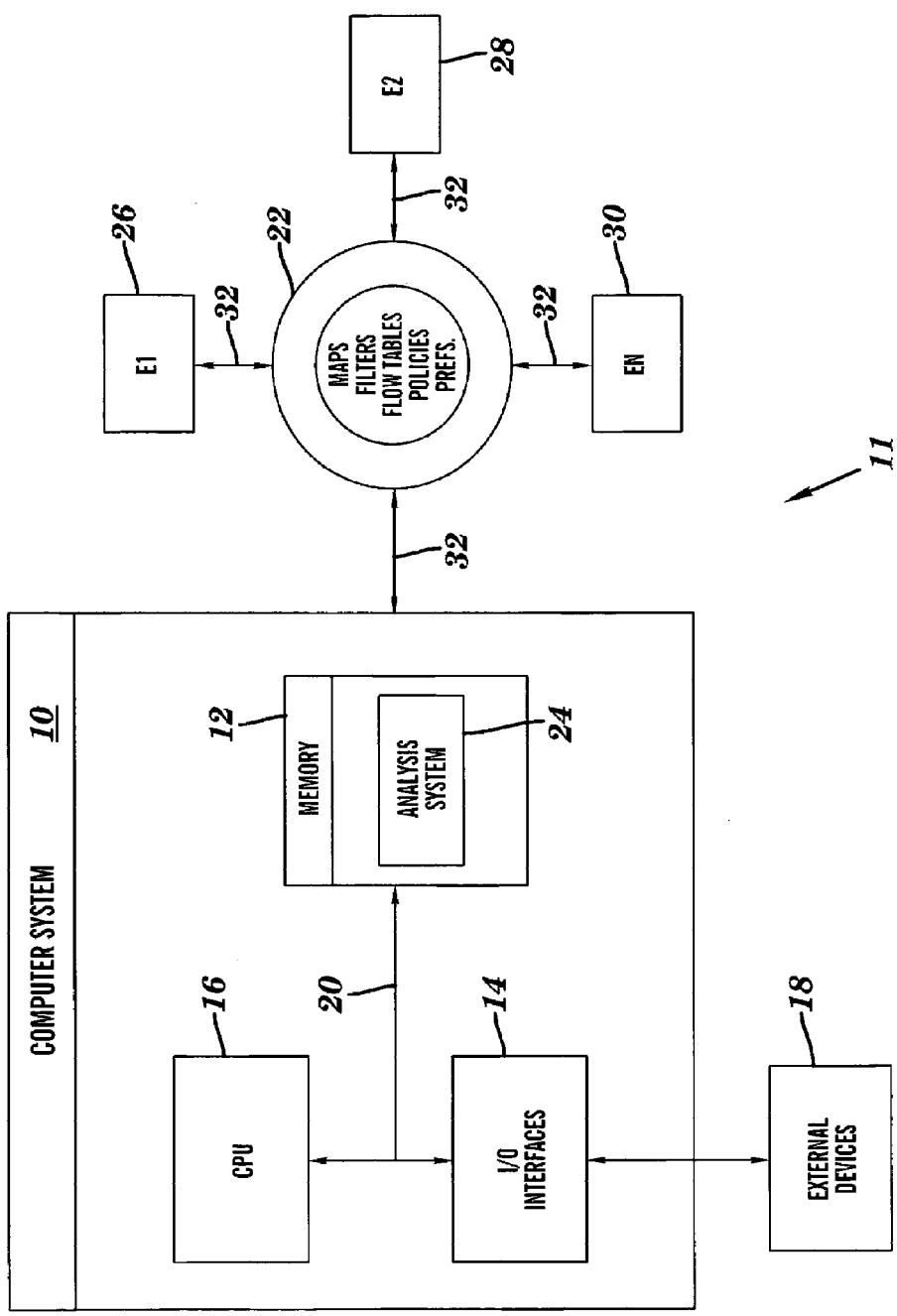
FIG. 1 depicts a computer system having an analysis system, according to the present invention.

It is noted that the drawings of the invention are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE DRAWINGS

For convenience, the description includes the following sections:
I. Definitions
II. Computer System
III. Analysis System I. Definitions SNS—a shared network system whereby multiple entities and networks share resources and communicate through at least one common router.

Entity—a participant in the SNS that is comprised of one or more networks.

Entity network—the network of an entity that participates in the SNS.

Sub-network—an internal network of an entity network.

Source network—an entity network or sub-network that is sending a communication to or requesting to use an application from another network.

Destination network—an entity network or sub-network that a source network is attempting to communicate with or utilize.

Filter file—a file that sets forth particular applications (e.g., web access) that flow through the router.

Flow table—a table that identifies particular source networks and destination networks that communications and applications are intended to flow between.

Policies—the internal security or communication/access guidelines for each entity.

Findings—conclusions reached by comparing source and destination networks identified by the entities to filter files, flow tables, and/or an overall network (SNS) map.

Communication—one entity network's communication with, access to, or utilization of another entity network.

II. Computer System

Generally stated, the present invention provides a system and method for analyzing a router in an SNS. Specifically, the present invention provides a system and method for retrieving information from a common router in an SNS. The information is provided by entities participating in the SNS and preferably includes filter files, flow tables, policies, internal network maps, and preferences. By parsing the flow tables and filter files to identify source and destination networks for each entity, and then comparing the identified networks to an overall network (SNS) map, policies and/or flow tables, findings can be identified.

Referring now to FIG. 1, an SNS 11 having a computer/server system entity 10 that includes the analysis system 24 of the present invention is shown. The computer system entity 10 generally comprises memory 12, input/output interfaces 14, a central processing unit (CPU) 16, external devices/resources 18, bus 20, and database 22. Memory 12 may comprise any known type of data storage, including magnetic media, optical media, random access memory (RAM), read-only memory (ROM), a data cache, a data object, etc. Moreover, memory 12 may reside at a single physical location, comprising one or more types of data storage, or be distributed across a plurality of physical systems in various forms. CPU 16 may likewise comprise a single processing unit, or be distributed across one or more processing units in one or more locations, e.g., on a client and server.

I/O interfaces 14 may comprise any system for exchanging information from an external source. External devices 18 may comprise any known type of external device, including a CRT, LED screen, hand held device, keyboard, mouse, voice recognition system, speech output system, printer, facsimile, pager, personal digital assistant, cellular phone, web phone, onboard diagnostics, etc. Bus 20 provides a communication link between each of the components in the server system 10 and likewise may comprise any known type of transmission link, including electrical, optical, wireless, etc. In addition, although not shown, additional components, such as cache memory, communication systems, system software, etc., may be incorporated into computer system 10.

Stored in memory 12 is analysis system 24 (shown in FIG. 1 as a software product). Analysis system 24 will be described in more detail below but generally comprises a system and method for analyzing a router 22 in an SNS. Although not shown, router 22 is intended include any known routing hardware and software. For example, router 22 could include a memory or database for storing entity information, as will be discussed in further detail below. Such memory may comprise one or more storage devices, such as a magnetic disk drive or an optical disk drive. In another preferred embodiment, memory includes data distributed across, for example, a local area network (LAN), wide area network (WAN) or a storage area network (SAN) (not shown). The memory may also be configured in such a way that one of ordinary skill in the art may interpret it to include one or more databases.

As defined above, entities 10, 26, 28, and 30 comprise one or more internal networks and/or sub-networks and participate in the SNS 11. Entities 26, 28, and 30 will provide their own network-specific information to the router 22. The information preferably includes filter files, flow tables, internal network maps, policies, and preferences. To analyze the router 22, the analysis system 22 will first retrieve this information from the router 22 and create an overall network (SNS) map based the retrieved internal maps. Then, the analysis system 24 will identify the source and destination networks by parsing the filter files and flow tables. Next, the analysis system 24 will identify any findings by comparing the source and destination networks to the flow tables, network (SNS) map, and/or policies. These findings, as well as the network map, could then be outputted to each entity 26, 28, and 30 in accordance with their preferences in a report or summary format. It should be appreciated that the order in which these steps are performed by the analysis system 24 could vary and are not intended to be limiting. For example, the analysis system 24 could identify the source and destination networks prior to creating an overall network (SNS) map.

The entities 26, 28, and 30 as well as the computer system entity 10 may communicate with the router 22 via communication networks 32. Communication networks 32 can be a direct terminal connected to the router 22, or a remote workstation in a client-server environment. In the case of the latter, the client and server may be connected via the Internet, wide area networks (WAN), local area networks (LAN) or other private networks. The server and client may utilize conventional token-ring connectivity for WAN, LAN, or other private networks, or Ethernet, or other conventional communications standards. Where the client is connected to the system server via the Internet, connectivity could be provided by conventional TCP/IP sockets-based protocol. In this instance, the client would utilize an Internet service provider outside the system to establish connectivity to the system server within the system.

It is understood that the present invention can be realized in hardware, software, or a combination of hardware and software. As indicated above, the computer system entity 10 according to the present invention can be realized in a centralized fashion in a single computerized workstation, or in a distributed fashion where different elements are spread across several interconnected computer systems (e.g., a network). Any kind of computer system—or other apparatus adapted for carrying out the methods described herein—is suited. A typical combination of hardware and software could be a general purpose computer system with a computer program that, when loaded and executed, controls the computer system entity 10 such that it carries out the methods described herein. Alternatively, a specific use computer, containing specialized hardware for carrying out one or more of the functional tasks of the invention could be utilized. The present invention can also be embedded in a computer program product, which comprises all the features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

III. Analysis System

Figure 2:
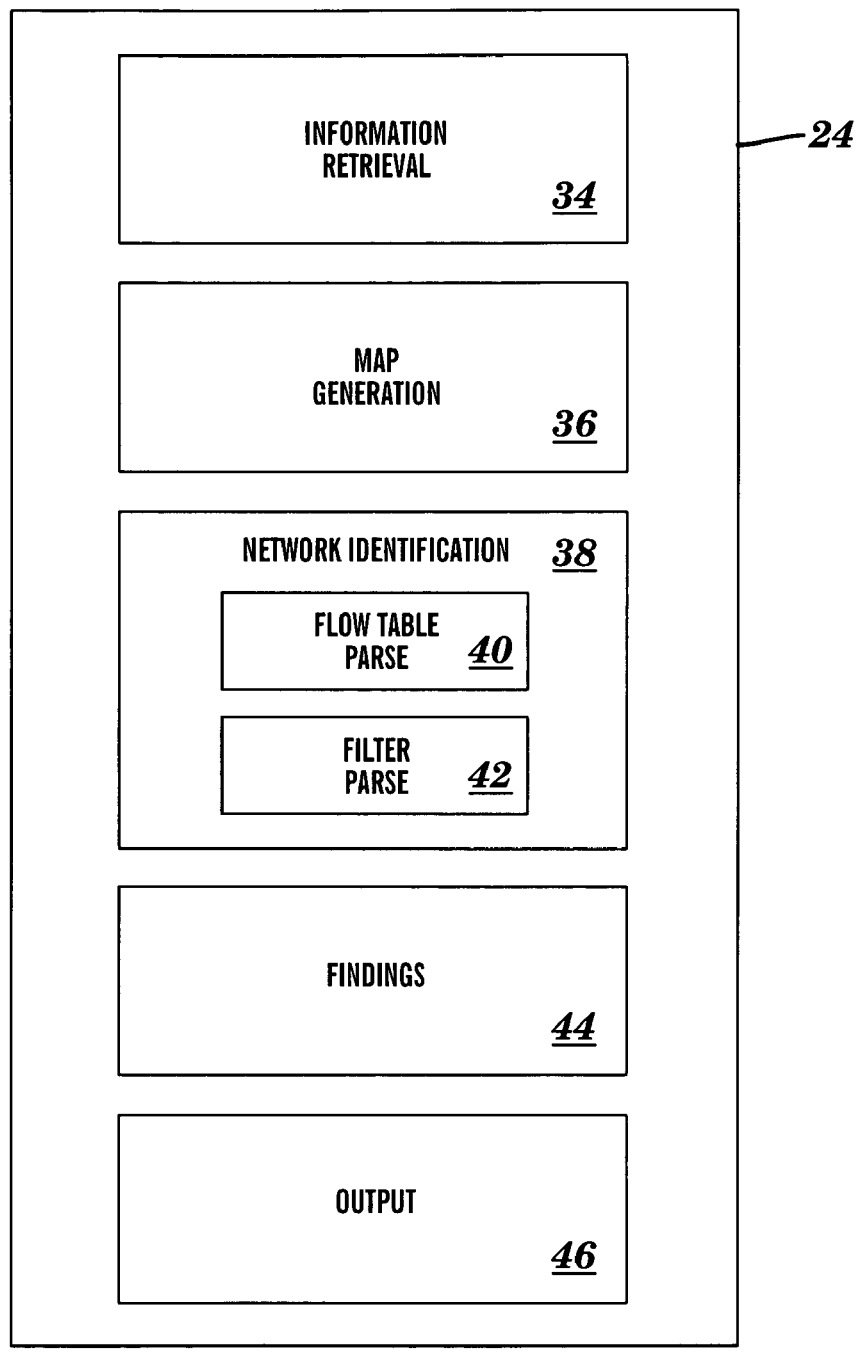
FIG. 2 depicts a box diagram of the analysis system of FIG. 1.

Referring now to FIG. 2, the analysis system 24 is shown in greater detail. As indicated above, each entity provides information that is used by the analysis system 24 in analyzing the router. The information preferably includes filter files, flow tables, internal network maps, policies, and preferences. Filter files set forth how particular applications will flow through the router. For example, a filter file may resemble the following:

filter permit-www-dst
    not tcp_dp in (80) break;
    not tcp_sp in (1024 . . . 65535) break;
    any succeed;
    end This filter file permits world wide web access for a particular (source) network from another (destination) network in the SNS. It is requiring that the communication to the destination entity, from the router, take place through router port 80. In addition, communication from the source entity to the router could be through any of router ports 1024 to 65535. As used herein, communication is intended to refer to one network's communication with, access to, or utilization of (e.g., for an application such as web access) another network.

A flow table is a table that identifies particular source networks and destination networks that communications and applications identified in filter files are intended to flow between. For example, a flow table may resemble:

Vr/1 Ip Ns Apply/100
    filter=permit-www-dst
    ipAddress1=10.0.0.0
    ipMask1=255.0.0.0
    ipAddress2=172.139.96.128
    ipMask2=255.255.255.192
    direction=to This flow table is named Vr/1 Ip Ns Apply/100 and pertains to the above world wide web access filter file. The apply table also sets forth specific source and destination networks. Specifically, in this flow table, the source network is identified by the IP address 10.0.0.0 and the IP mask 255.0.0.0. These two components identify the source network and sub-network, respectively. Moreover, by forming an AND result of the IP Address and IP Mask, the host identification is obtained as well. Similarly, the IP Address 2 of 172.139.96.128 and IP Mask2 of 255.255.255.192 identify the destination network and destination sub-network. As indicated above, by forming the AND result of the IP Address2 and IP Mask2, the destination host is identified as well. Therefore, based on the flow table, a particular source network and destination network for world wide web access are identified.

The direction "to" indicates that world wide web access can only occur, with this flow table, from the identified source network to the destination network and not vice versa. If the direction was "from," the destination network could obtain world wide web access from the source network, but not vice versa. However, if the direction was "to from," either network could obtain world wide web access from the other. It should be appreciated that the filter file and flow table examples are for illustrative purposes only and are not intended to be limiting. It should be further appreciated that the filter files could identify source and destination networks themselves. In this case, flow tables could be disregarded or, more preferably, could be used to double check the accuracy of the network identifications.

The internal network maps are either text based or illustrative maps indicating the precise architecture of each entity's network(s). As indicated above, a network may include various sub-networks. Accordingly, by requiring each entity to include a map of their own network architecture, an overall network map could be generated.

Policy information pertains to the security policy for a particular entity. For example, entity A might not want its sub-networks B and C communicating with each other. Such information would be set forth in the policy. Similarly, entity A might not want its network to communicate at all with entity B's network. Again, such information would be included in the policy.

Preferences dictate the format and appearance that reports/summaries generated and outputted by the analysis system 24 should resemble. Specifically, each entity would receive a report of security findings as well as an overall network map. Each entity may like to view the report of findings in a different format. The preferences would allow the analysis system 24 to accommodate each entity's findings. Preferably, the preferences and policy information are provided by each entity in a single "configuration file." However, it should be appreciated that other equivalent alternatives exist.

Once each entity has provided this information, the information retrieval system 34 of the analysis system 24 will access the router and retrieve the information. Preferably, the information is provided by the entities and retrieved by the retrieval system 34 at a regularly scheduled interval (e.g., weekly, monthly, etc.). Once retrieved, the map generation system 36 will use each entity's internal network map to generate/compile an overall network (SNS) map. This map will later be used to identify findings.

The source networks and destination networks for each intended communication will then be identified by network identification system 38. Specifically, filter parse system 42 will access/parse each filter file and identify the applications flowing through the router. Next, flow table parse system 40 will access/parse each flow table to identify the specific source and destination networks for each communication (as described above). It should be appreciated that although not illustrated in the above exemplary filter file, the filter files may themselves indicate the source and destination networks. In these situations, the source and destination networks could be identified by parsing the filter files.

Once the applications, source networks, and destination networks have been identified, security findings will be made. Generally, findings are identified by comparing the applications, source, and/or destination networks to the overall network map and policy of each entity. For example, entity A may be trying to communicate with entity B's network. However, entity A's policy might forbid this communication. Similarly, entity B's policy might forbid incoming communications from entity A. In either case, a finding would be identified. The policy could also dictate the level of security risk such a communication poses. For example, entity A's policy might label such a communication with a risk level of "medium," while entity B's might label it as "high." Each entity would then be informed of the finding in a manner consistent with their preferences.

Another example of a finding could result when a network is identified, but does not exist in the SNS. To identify this finding, the source and destination networks would be compared to the overall network map generated by map generation system 36. For example, according to entity A's flow table, a communication might flow from network A to network B. However, upon comparing these networks to the network map, it is discovered that network B does not exist, or at least does not participate in the SNS. This finding would be reported back to entity A. This finding could occur where an entity is using an incorrect network map, or inputs data into an apply table erroneously.

A third example of a possible finding is if entity A is attempting to obtain world wide web access for their network from entity B's network. However, upon reviewing entity B's policy, it is discovered that network A is permitted to access network B for all applications except world wide web access. This finding would then be reported to both entities.

A fourth example of a possible finding could result when a filter file identifies a source or destination network (as described above) that conflicts with what is stated in a flow table. In this case, the conflict finding would be reposted back to the entity. It should be understood that the exemplary findings cited herein are for illustrative purposes only and are not intended to be exhaustive or limiting.

Once all findings have been identified, the analysis system 24 could then output the findings, as well as the network (SNS) map, using output system 46. As indicated above, each entity provided preferences for receiving the output. The analysis system 24 would provide an "executive summary" or the like, which clearly sets forth the findings in accordance with the entities' policy and preferences. Preferably, the summary would set forth each entity's findings by identifying particular flow tables, the specific finding, risk level, and risk type. For example, the summary may resemble:

| FLOW TABLE | RISK LEVEL | RISK TYPE | FINDING |
|---|---|---|---|
| Vr/1 Ip Ns Apply/100 | Medium | Policy | Flow not permitted |
| Vr/2 Ip Ns Apply/300 | High | Map | Dest. not on map |
| Vr/1 Ip Ns Apply/100 | Low | Info. | Info. missing |

In the above summary, the Flow Table column identifies specific apply tables that resulted in findings. The Risk Level column informs the entity of the risk level of each finding, based on the policy provided. The risk type indicates the type of finding made. For example, "Policy" type indicates that a network identified in the flow table is in conflict with the entity's policy. The "Map" type indicates that a communication was attempted with a network that is not on the map. The "Info." type indicates that information was missing from the apply table that prevented a communication from occurring. An example of this could result when a destination network was not identified in the flow table. The Finding column sets forth the specific finding for a corresponding Risk Type. For example, the "Flow not permitted" finding indicates that a communication was attempted that was contrary to the entity's policy. It should be understood that this executive summary is illustrative only and is not intended to be limiting. Moreover, it should be understood that the executive summary could also include the overall network map.

As indicated above, it should be understood that the order of the steps in which analysis system 24 analyzes the router could vary. For example, the source and destination networks could be identified prior to creation of the overall network (SNS) map.

Figure 3:
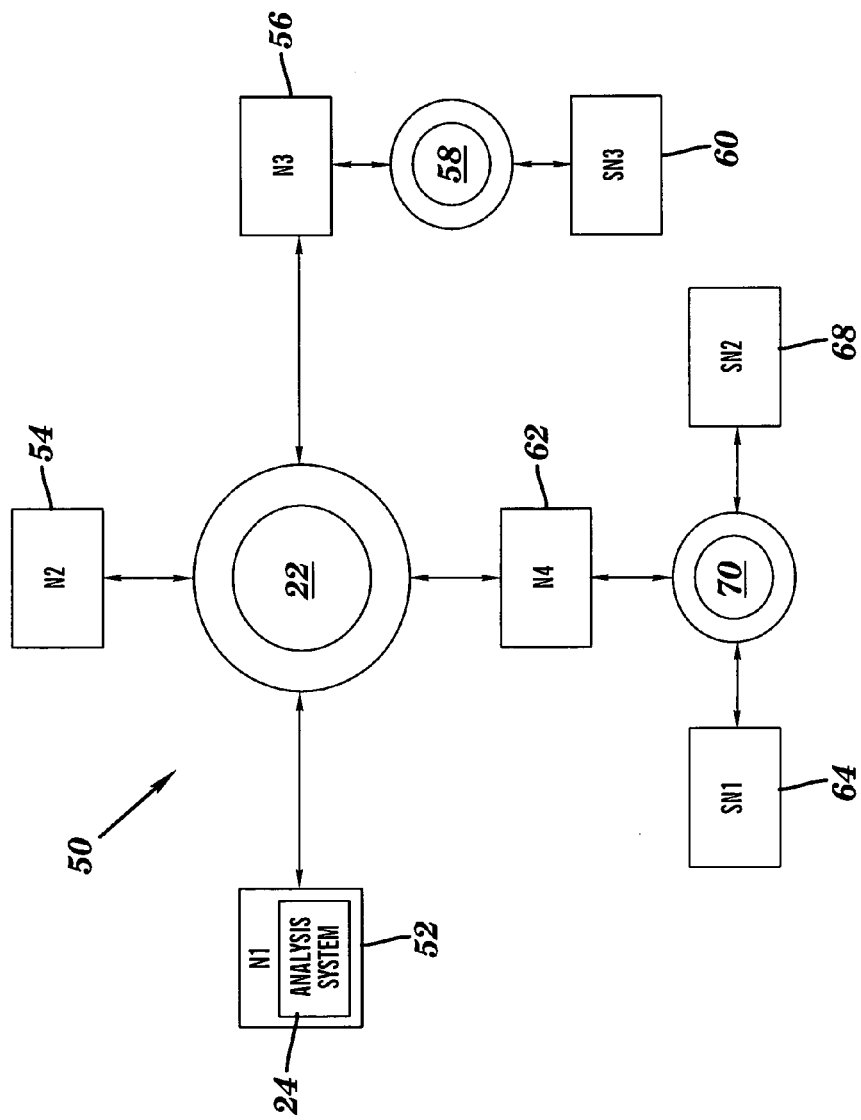
FIG. 3 depicts a diagram of an exemplary embodiment a network map.

Referring now to FIG. 3, an exemplary network map of an SNS 50 is depicted. As depicted, the network map includes networks 52, 54, 56, and 62, which all communicate through common router 22. For illustrative purposes, analysis system 24 is shown as residing on network 52. However, it should be appreciated that any network could implement the analysis system 24. Each network would provide their information (filter files, flow tables, internal maps, preferences, and policies) to router 22, which analysis system 24 would retrieve. In this illustration networks, 56 and 62 each have sub-networks 60, 64, and 68. In addition, networks 56 and 62 also each have an internal router 58 and 70. Thus, it should be understood that networks communicating with common router 22 could be complex and include many sub-networks and routers. As indicated above, the network map could be outputted with the executive summary findings.

By each entity providing their information, it is possible for analysis system 24 to create an SNS map and identify findings, even from internal communications. For example, if sub-network 64 attempted to access sub-network 68, and such access was against the policy for network 62, a finding would be identified. As explained above, this occurs when the analysis system 24 retrieves the information for network 62 from the common router 22. In the filter files and flow tables, the proposed access from sub-network 64 to sub-network 68 would be identified. Upon comparing the proposed access to the policy for network 62, the finding would be identified. Accordingly, by analyzing only the common router 22 (or the information stored thereon), the security for the entire SNS can be managed. Previous systems, in contrast, required a separate analysis of each entity network and sub-network.

Figure 4:
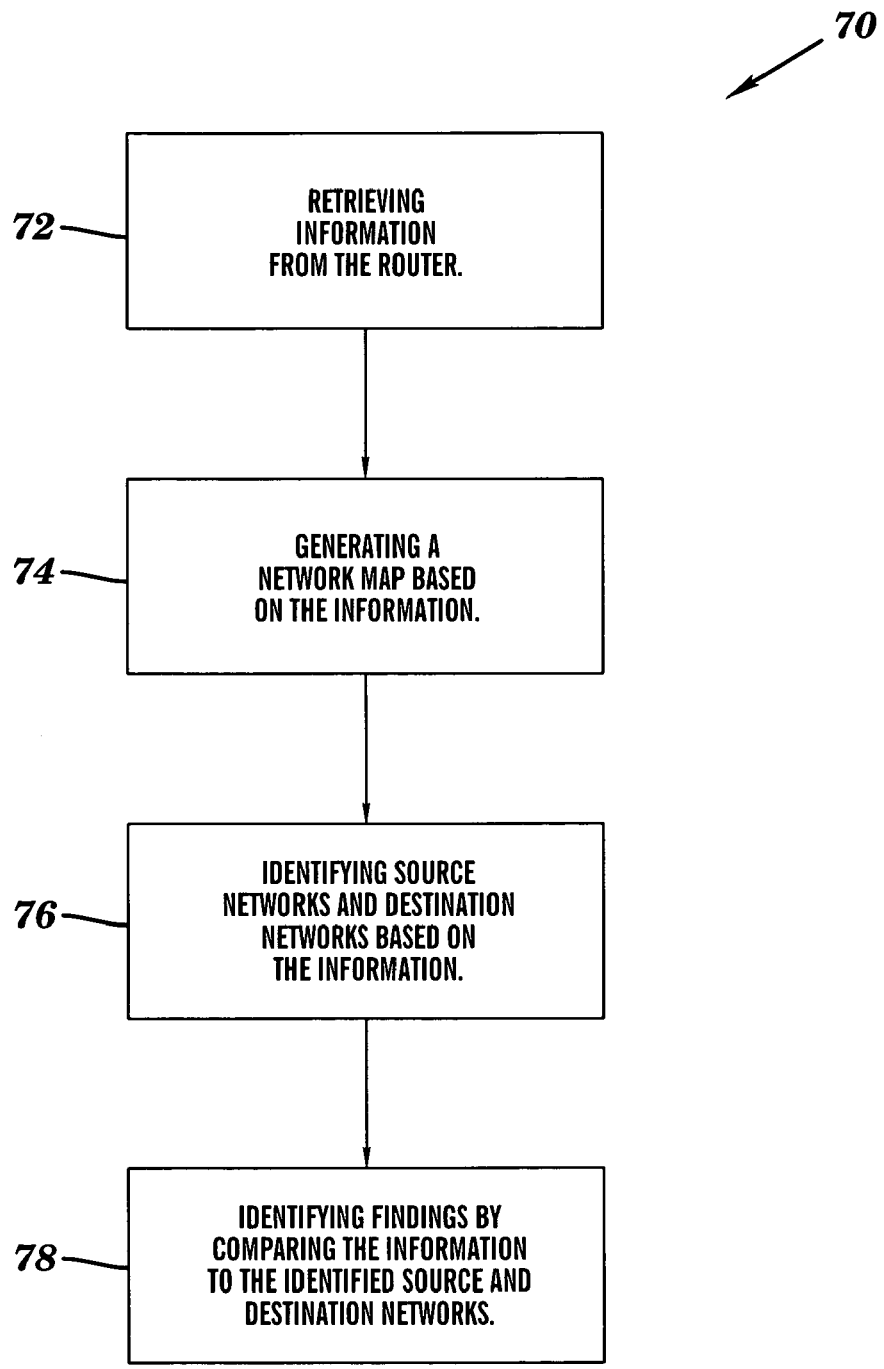
FIG. 4 depicts a flow chart of a method, according to the present invention.

Referring now to FIG. 4, a flow chart of a method for analyzing a router in a shared network system according to the present invention is shown. The first step 72 of method 70 is to retrieve information from the router. The second step 74 is to generate a network map based on the information. The third step 76 of method 70 is to identify source networks and destination networks based on the information. The fourth step 78 is to identify findings by comparing the information to the identified source and destination networks.

Computer recordable media can be any available media that can be accessed by a computer. By way of example, and not limitation, computer readable media may comprise "computer storage media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

The invention claimed is:

1. A system for detecting security risks in a shared network system shared by different entity networks, said system comprising:
   a central processing unit, a memory and a computer readable storage;
   first program instructions to retrieve, from a router for said shared network system, flow tables that identify source and destination networks for which intercommunication is permitted, security policies indicating that at least one of said entity networks is not permitted to communicate with another of said entity networks, filter files that identify at least one of said entity networks which is permitted to use another of said entity networks to access web applications outside of said shared network system, and maps of respective entity networks of said shared network system;
   second program instructions to generate a shared network map of said shared network system, based at least in part on said maps of said respective entity networks, said shared network map including said different entity networks;
   third program instructions to identify a set of permitted communications through said router based on said flow tables and filter files; and
   fourth program instructions to identify a permitted communication of said set which represents a security risk based on said shared network map and said security policies; and wherein
   said first, second, third and fourth program instructions are stored in said computer readable storage for execution by said central processing unit via said memory.

2. A computer system as set forth in claim 1 wherein:
   said security policies also identify a subnet within one of said entity networks which is not permitted to communicate with another subnet within said one entity network; and
   said fourth program instructions identify a permitted communication of said set which represents a security risk based also on said security policies which identify a subnet within one of said entity networks which is not permitted to communicate with another subnet within said one entity network.

3. A computer system as set forth in claim 1 further comprising fifth program instructions to display on a computer monitor said security risks; and wherein
   said fifth program instructions are stored in said computer readable storage for execution by said central processing unit via said memory.

4. A computer program product for detecting security risks in a shared network system shared by different entity networks, said computer program product comprising:
   a computer readable storage media;
   first program instructions to retrieve, from a router for said shared network system, flow tables that identify source and destination networks for which intercommunication is permitted, security policies indicating that at least one of said entity networks is not permitted to communicate with another of said entity networks, filter files that identify at least one of said entity networks which is permitted to use another of said entity networks to access web applications outside of said shared network system, and maps of respective entity networks of said shared network system;
   second program instructions to generate a shared network map of said shared network system, based at least in part on said maps of said respective entity networks, said shared network map including said different entity networks;
   third program instructions to identify a set of permitted communications through said router based on said flow tables and filter files; and
   fourth program instructions to identify a permitted communication of said set which represents a security risk based on said shared network map and said security policies; and wherein
   said first, second, third and fourth program instructions are stored on said computer readable storage media.

5. A computer program product as set forth in claim 4 wherein:
   said security policies also identify a subnet within one of said entity networks which is not permitted to communicate with another subnet within said one entity network; and
   said fourth program instructions identify a permitted communication of said set which represents a security risk based also on said security policies which identify a subnet within one of said entity networks which is not permitted to communicate with another subnet within said one entity network.

6. A computer program product as set forth in claim 4 further comprising fifth program instructions to display on a computer monitor said security risks; and wherein
   said fifth program instructions are stored on said computer readable storage media.

* * * * *

UNITED STATES PATENT AND TRADEMARK OFFICE
CERTIFICATE OF CORRECTION

PATENT NO. : 7,590,745 B2  Page 1 of 1
APPLICATION NO. : 09/798835
DATED : September 15, 2009
INVENTOR(S) : James B. Haugen It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1038 days.

Signed and Sealed this

Twenty-first Day of September, 2010

David J. Kappos
*Director of the United States Patent and Trademark Office*